Sept. 6, 1927.

C. H. ZIERDT
ELECTRORESPONSIVE CELL

Original Filed Dec. 14, 1922

1,641,564

INVENTOR:
C. H. Zierdt,
BY
ATTORNEY

Patented Sept. 6, 1927.

1,641,564

UNITED STATES PATENT OFFICE.

CONRAD H. ZIERDT, OF ROSEDALE, PENN TOWNSHIP, ALLEGHENY COUNTY, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRORESPONSIVE CELL.

Application filed December 14, 1922, Serial No. 606,820. Renewed January 22, 1925.

My invention relates to thermo-sensitive cells, that is, cells which depend for their action upon changes in the electrical characteristics of a substance in response to changes in temperature.

I will describe one form of thermo-sensitive cell embodying my invention, and one form of electrical apparatus employing such a cell, and will then point out the novel features thereof in the claim.

Figure 2:
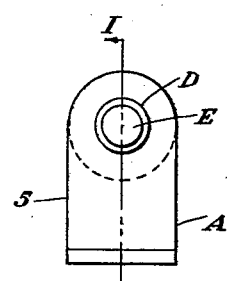
Figure 1:
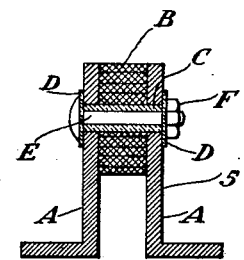
Figure 3:
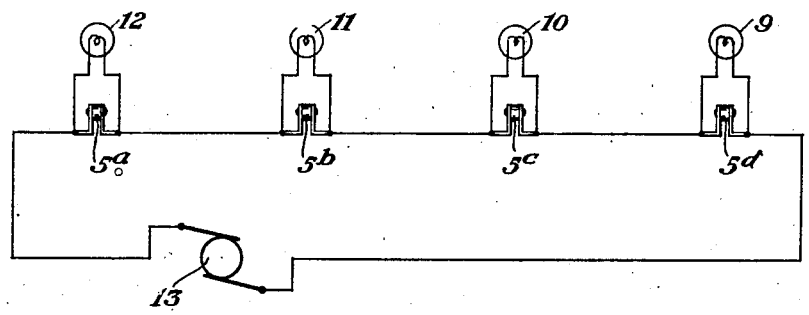

In the accompanying drawings, Fig. 1 is a vertical, longitudinal sectional view showing one form of thermo-sensitive cell embodying my invention. Fig. 2 is a view showing in front elevation the thermo-sensitive cell shown in Fig. 1. Fig. 3 is a diagrammatic view showing one form of electrical apparatus particularly adapted to use with a thermo-sensitive cell embodying my invention.

Similar reference characters refer to similar parts in each of the several views.

Referring first to Figs. 1 and 2, the thermo-sensitive cell, which is designated as a whole by the reference character 5, comprises two end plates A having outstanding lugs which serve as a base for the cell. Interposed between these two end plates is an element B of thermo-sensitive material having a high negative temperature co-efficient and which as here shown is in the form of a cylindrical button. This element comprises a pulverized thermo-sensitive material such as copper oxide, mixed with a suitable binder such as sodium silicate. This element may be conveniently manufactured by mixing the pulverized copper oxide with the sodium silicate in proper proportions, pressing the resulting mixture into a mold of suitable form and subjecting the molded mixture to a high temperature whereby the element is baked into a solid, rigid mass. This element B is clamped firmly between the two end plates A by means of a bolt E which passes through these end plates and the thermo-sensitive element but is insulated therefrom by an insulating cylinder C and two insulating washers D.

In Fig. 3 I show an arrangement of apparatus adapted for street series lighting. A plurality of incandescent lamps 12, 11, 10 and 9 are connected in series with a source of energy such as a generator 13. Connected in parallel with lamp 12 is a thermo-sensitive cell $5^a$ such as that shown in Figs. 1 and 2. Similar thermo-sensitive cell $5^b$, $5^c$ and $5^d$ are connected in parallel with the lamps 11, 10 and 9, respectively. The operation of the system is as follows: When all of the lamps are lighted, the voltage applied to each cell 5 is comparatively low and the current which flows through the cell is also comparatively low so the cell is of comparatively high resistance. If, however, one of the lamps burns out, substantially the entire voltage of the generator is momentarily applied to the electrodes of the associated thermo-sensitive cell because the current flow in the circuit is substantially zero. This results in an increased current through the cell, and a point will be reached above which the heat generated is not all radiated and a consequent rise of temperature follows: This rise in temperature decreases the resistance of the copper oxide which further increases the current through the cell and this accumulative effect continues till enough current is passed to light the lamps 11, 10, and 9. Thus the system is protected against extinguishing of the remaining lamps due to failure of one lamp. When the defective lamp 12 is replaced by a lamp which is operable the voltage on the cell $5^a$ and consequently the current through it is decreased and the resulting drop in temperature restores the circuit to its normal condition. The time required for the cell to "break down" and the voltage necessary for this operation may both be regulated by proper variation in the structure, dimensions and proportions of the thermo-sensitive element B.

One feature of my invention is that the thermo-sensitive cell 5 is "self-healing", that is, it does not have to be replaced after each failure of the accompanying lamp but is automatically restored to its normal condition by the replacement of the lamp.

Although I have herein shown and described only one form of thermo-sensitive cell embodying my invention, it is understood that various changes and modifications may be made therein within the scope of the appended claim, without departing from the spirit and scope of my invention.

Having thus described my invention, what I claim is:

A thermo-sensitive cell characterized by a considerable decrease in resistance in response to increase of current, and suitable for use as an automatic cut-out in a series lighting system, said cell comprising pulverized cuprous oxide and sodium silicate molded together and baked into a solid rigid mass.

In testimony whereof I affix my signature.

CONRAD H. ZIERDT.